US008084129B2

(12) United States Patent
Chou

(10) Patent No.: US 8,084,129 B2
(45) Date of Patent: *Dec. 27, 2011

(54) LAMINATED ARTICLES COMPRISING A SHEET OF A BLEND OF ETHYLENE COPOLYMERS

(75) Inventor: Richard T. Chou, Hockessin, DE (US)

(73) Assignee: E. I. du Pont de Nemours and Company, Wilmington, DE (US)

( * ) Notice: Subject to any disclaimer, the term of this patent is extended or adjusted under 35 U.S.C. 154(b) by 433 days.

This patent is subject to a terminal disclaimer.

(21) Appl. No.: 12/276,822

(22) Filed: Nov. 24, 2008

(65) Prior Publication Data

US 2010/0129665 A1  May 27, 2010

(51) Int. Cl.
| | |
|---|---|
| B32B 17/10 | (2006.01) |
| B32B 27/32 | (2006.01) |
| B32B 27/40 | (2006.01) |
| B32B 27/08 | (2006.01) |
| B32B 27/30 | (2006.01) |
| B32B 27/34 | (2006.01) |
| B32B 27/36 | (2006.01) |

(52) U.S. Cl. ............ 428/412; 428/421; 428/424.4; 428/425.6; 428/436; 428/437; 428/441; 428/442; 428/475.8; 428/476.9; 428/483; 428/510; 428/515; 428/517; 428/518

(58) Field of Classification Search ............ 428/412, 428/421, 424.4, 425.6, 436, 437, 441, 442, 428/475.8, 476.9, 483, 510, 515, 517, 518
See application file for complete search history.

(56) References Cited

U.S. PATENT DOCUMENTS

| | | |
|---|---|---|
| 2,897,183 A | 7/1959 | Christl et al. |
| 3,350,372 A | 10/1967 | Anspon et al. |
| 4,347,341 A | 8/1982 | Bartl et al. |
| 4,351,931 A | 9/1982 | Armitage |
| 4,614,781 A | 9/1986 | Hori et al. |
| 5,028,674 A | 7/1991 | Hatch et al. |
| 5,507,881 A | 4/1996 | Sichanugrist et al. |
| 5,512,107 A | 4/1996 | van den Berg |
| 5,532,066 A | 7/1996 | Latiolais et al. |
| 5,759,698 A | 6/1998 | Tanuma et al. |
| 5,859,137 A | 1/1999 | Chou |
| 5,948,176 A | 9/1999 | Ramanathan et al. |
| 5,994,163 A | 11/1999 | Bodegård et al. |
| 6,040,521 A | 3/2000 | Kushiya et al. |
| 6,042,930 A | 3/2000 | Kelch et al. |
| 6,137,048 A | 10/2000 | Wu et al. |
| 6,258,620 B1 | 7/2001 | Morel et al. |
| 6,414,236 B1 | 7/2002 | Kataoka et al. |
| 6,855,432 B1 | 2/2005 | Hojabr et al. |
| 6,924,427 B2 | 8/2005 | Eckert et al. |
| 7,186,917 B1 | 3/2007 | Van De Wiele, Jr. |
| 7,199,188 B2 | 4/2007 | Chou |
| 7,279,520 B2 | 10/2007 | Hausmann et al. |
| 7,935,765 B2 | 5/2011 | Chou |
| 2005/0187315 A1 | 8/2005 | Dean |
| 2005/0228145 A1 | 10/2005 | Lacroix et al. |
| 2005/0247402 A1 | 11/2005 | Fujiki et al. |
| 2006/0025527 A1 | 2/2006 | Chou |
| 2006/0148988 A1 | 7/2006 | Chou |
| 2006/0160952 A1 | 7/2006 | Chou et al. |
| 2006/0201544 A1 | 9/2006 | Inoue |
| 2007/0004860 A1 | 1/2007 | Leboeuf |
| 2007/0079866 A1 | 4/2007 | Borden et al. |
| 2007/0155904 A1 | 7/2007 | Chou |
| 2007/0209699 A1 | 9/2007 | Sichanugrist et al. |
| 2007/0227578 A1 | 10/2007 | Perozziello et al. |
| 2007/0232057 A1 | 10/2007 | Borden et al. |
| 2007/0238285 A1 | 10/2007 | Borden |
| 2007/0240759 A1 | 10/2007 | Borden |
| 2007/0255007 A1 | 11/2007 | Dean |
| 2007/0281090 A1 | 12/2007 | Kurita et al. |
| 2007/0298590 A1 | 12/2007 | Choi et al. |
| 2008/0078445 A1 | 4/2008 | Patel et al. |
| 2008/0115825 A1 | 5/2008 | Patel et al. |
| 2008/0255303 A1 | 10/2008 | Chou |
| 2008/0302417 A1 | 12/2008 | Inoue et al. |
| 2009/0274856 A1 | 11/2009 | Chou |

FOREIGN PATENT DOCUMENTS

| | | |
|---|---|---|
| GB | 1157569 | 7/1969 |
| JP | 09-178909 A | 7/1997 |
| JP | 11-020091 A | 1/1999 |
| JP | 2008-117925 A | 5/2008 |
| WO | 03/035744 A1 | 5/2003 |
| WO | 03/065472 A2 | 8/2003 |
| WO | 03/099930 A1 | 12/2003 |
| WO | 2009/101369 A1 | 8/2009 |

OTHER PUBLICATIONS

Office Action mailed Apr. 12, 2011, in co-pending U.S. Appl. No. 12/972,847.
Office Action mailed May 3, 2011, in co-pending U.S. Appl. No. 12/972,828.

*Primary Examiner* — D. S. Nakarani

(57) ABSTRACT

Disclosed laminates particularly useful as safety glazings comprising a polymeric interlayer sheet, wherein the polymeric interlayer sheet comprises a blend composition of an ethylene copolymer A and an ethylene copolymer B, which has a melt flow rate of less than 100g/10 min, as determined in accordance with ASTM D1238 at 190° C. and 2.16 kg, and wherein the ethylene copolymer A comprises copolymerized units of ethylene and about 3 to about 20 wt % of an ester or anhydride of a $C_4$-$C_8$ unsaturated acid having two carboxylic acid groups and the ethylene copolymer B comprises copolymerized units of ethylene and about 6 to about 40 wt % of a polar monomer selected from the group consisting of vinyl acetate, alkyl(meth)acrylates, and mixtures thereof.

15 Claims, No Drawings

LAMINATED ARTICLES COMPRISING A SHEET OF A BLEND OF ETHYLENE COPOLYMERS

FIELD OF THE INVENTION

The present invention is directed to safety laminates that comprise a polymeric sheet formed of a blend of ethylene copolymers.

BACKGROUND OF THE INVENTION

Safety laminates have been in commercial production for almost a century and have been utilized in applications that require sheet material having a high degree of clarity and impact resistance. For example, safety laminates have been widely used in the automobile industry as windshields or side windows because the laminate structures are characterized by high impact and penetration resistance and do not scatter glass shards and debris when shattered. More recently, safety laminates are also being incorporated into building structures as windows, walls, stairs, etc.

Safety laminates typically consist of a sandwich of two glass sheets or panels bonded together with an interlayer of a polymeric sheet. One or both of the glass sheets may be replaced with optically clear rigid polymeric sheets, such as sheets made of polycarbonate. Safety glass laminates have further evolved to include multiple layers of glass and polymeric sheets bonded together with interlayers of polymeric sheets.

The interlayers used in safety laminates are typically made from relatively thick polymer sheets, which exhibit toughness and bondability to the glass in the event of a crack or crash. Widely used interlayer materials include complex, multicomponent compositions based on poly(vinyl butyral), poly(urethane), ethylene vinyl acetate copolymers and ionomeric ethylene carboxylic acid copolymers (such as ionic, partially or fully neutralized ethylene methacrylic acid copolymers and ionic, partially or fully neutralized ethylene acrylic acid copolymers (i.e. ethylene methacrylic acid copolymer ionomers and ethylene acrylic acid copolymer ionomers)).

Blend compositions of ethylene copolymers, such as those disclosed in U.S. Patent Publication Nos. 2006/0025527, 2006/0160952 and 2006/0148988, have been found to exhibit high temperature resistance and good high frequency weldability. In addition, the blend compositions can adhere well to metals (such as aluminum) or plastics (such as polyamides and polyolefins). However, it has been found, that polymeric sheets made from such ethylene copolymer blends can also form superior adhesive bonds to glass, and that such adhesive bonds are water resistant.

SUMMARY OF THE INVENTION

Disclosed herein is a laminate comprising an interlayer sheet that is laminated to one or more rigid sheets or film layers, the at least one interlayer sheet comprising a blend composition of ethylene copolymers that has a melt flow rate of less than 100 g/10 min, as determined in accordance with ASTM D1238 at 190° C. and 2.16 kg, and comprises: (A) about 5 to about 95 wt %, or about 5 to about 40 wt %, of an ethylene copolymer A, based on the total weight of the blend composition, wherein the ethylene copolymer A comprises copolymerized units of ethylene and about 3 to about 20 wt % of a comonomer selected from the group consisting of esters of $C_4$-$C_8$ unsaturated acids having two carboxylic acid groups, anhydrides of $C_4$-$C_8$ unsaturated acids having two carboxylic acid groups, and mixtures thereof, based on the total weight of the ethylene copolymer A and (B) about 5 to about 95 wt %, or about 60 to about 95 wt %, of an ethylene copolymer B, based on the total weight of the blend composition, wherein ethylene copolymer B comprises copolymerized units of ethylene and about 6 to about 40 wt % of at least one polar monomer selected from the group consisting of vinyl acetate, alkyl acrylates, alkyl methacrylates, and mixtures of any two or more thereof, based on the total weight of the ethylene copolymer B, with the proviso that ethylene copolymer A and ethylene copolymer B are chemically distinct. The esters of the $C_4$-$C_8$ unsaturated acids having two carboxylic acid groups may be selected from the group consisting of monoesters of $C_4$-$C_8$ unsaturated acids having two carboxylic acid groups, diesters of $C_4$-$C_8$ unsaturated acids having two carboxylic acid groups, and mixtures of any two or more thereof. The ethylene copolymer A may comprise about 6 to about 15 wt %, or about 8 to about 15 wt %, of copolymerized units of a monoester of a $C_4$-$C_8$ unsaturated acid having two carboxylic acid groups. The ethylene copolymer B may comprise about 12 to about 32 wt % of copolymerized units of the at least one polar monomer and the at least one polar monomer may be vinyl acetate or may be selected from the group consisting of $C_1$-$C_6$ alkyl acrylates, $C_1$-$C_6$ alkyl methacrylates, and mixtures of two or more thereof.

In another embodiment, a rigid sheet comprised in the laminate may comprise a material having a modulus of about 690 MPa or greater, as determined in accordance with ASTM D638, and be selected from the group consisting of glass, metal, ceramics, and polymers, and a film layer comprised in the laminate may be a metal film or a polymeric film comprising a material selected from the group consisting of polyesters, polycarbonates, polyolefins, norbornene polymers, polystyrenes, styrene-acrylate copolymers, acrylonitrile-styrene copolymers, polysulfones, polyamides, polyurethanes, acrylic polymers, cellulose acetates, cellophanes, vinyl chloride polymers, fluoropolymers, and mixtures of two or more thereof.

In a further embodiment, the laminate further comprises one or more additional polymeric interlayers and the one or more other polymeric interlayers comprise materials selected from the group consisting of poly(vinyl acetals), poly(vinyl chlorides), polyurethanes, ethylene/vinyl acetate copolymers, acid copolymers, ionomers of acid copolymers, and mixtures of two or more thereof.

In a yet further embodiment, the laminate may have the interlayer sheet comprising the blend composition laminated between two glass sheets.

In a yet further embodiment, the laminate may have the interlayer sheet comprising the blend composition laminated between a glass sheet and a polyester film that is coated on one surface with an abrasion resistant hardcoat, the coated surface of the polyester film facing away from the interlayer sheet.

In a yet further embodiment, the laminate may comprise n rigid sheets or film layers and n−1 polymeric interlayer sheets, wherein (a) n is an integer of 1-10; (b) each pair of adjacent rigid sheets or film layers are interspaced with one polymeric interlayer sheet; and (c) at least one polymeric interlayer sheet is a sheet comprising the blend composition as described above.

DETAILED DESCRIPTION OF THE INVENTION

Unless otherwise defined, all technical and scientific terms used herein have the same meaning as commonly understood by one of ordinary skill in the art to which this invention belongs. In case of conflict, the specification, including definitions, will control.

Although methods and materials similar or equivalent to those described herein can be used in the practice or testing of the invention, suitable methods and materials are described herein.

Unless stated otherwise, all percentages, parts, ratios, etc., are by weight.

When an amount, concentration, or other value or parameter is given as either a range, preferred range or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

When the term "about" is used in describing a value or an end-point of a range, the disclosure should be understood to include the specific value or end-point referred to.

As used herein, the terms "comprises," "comprising," "includes," "including," "containing," "characterized by," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or.

The transitional phrase "consisting essentially of" limits the scope of a claim to the specified materials or steps and those that do not materially affect the basic and novel characteristic(s) of the claimed invention.

Where applicants have defined an invention or a portion thereof with an open-ended term such as "comprising," it should be readily understood that unless otherwise stated the description should be interpreted to also describe such an invention using the term "consisting essentially of".

Use of "a" or "an" are employed to describe elements and components of the invention. This is merely for convenience and to give a general sense of the invention. This description should be read to include one or at least one and the singular also includes the plural unless it is obvious that it is meant otherwise.

In describing certain polymers it should be understood that sometimes applicants are referring to the polymers by the monomers used to produce them or the amounts of the monomers used to produce the polymers. While such a description may not include the specific nomenclature used to describe the final polymer or may not contain product-by-process terminology, any such reference to monomers and amounts should be interpreted to mean that the polymer comprises those monomers (i.e. copolymerized units of those monomers) or that amount of the monomers, and the corresponding polymers and compositions thereof.

In describing and/or claiming this invention, the term "copolymer" is used to refer to polymers formed by copolymerization of two or more monomers. Such copolymers include dipolymers, terpolymers or higher order copolymers.

Disclosed herein is a safety laminate comprising at least one interlayer sheet, wherein the interlayer sheet comprises an ethylene copolymer blend composition.

The ethylene copolymer blend composition used herein has a melt flow rate (MFR) less than about 100 g/10 min, or less than about 85 g/10 min, or less than about 60 g/10 min, or about 1 to about 40 g/10 min, as determined in accordance with ASTM D1238 at 190° C. and 2.16 kg, and comprises (a) about 5 to about 95 wt %, or about 5 to about 40 wt %, or about 10 to about 30 wt % of an ethylene copolymer A, based on the total weight of the blend composition and (b) about 5 to about 95 wt %, or about 60 to about 95 wt %, or about 70 to about 90 wt % of an ethylene copolymer B, based on the total weight of the blend composition, wherein (i) the ethylene copolymer A comprises copolymerized units of ethylene and about 3 to about 20 wt % of copolymerized units of an ester of a $C_4$-$C_8$ unsaturated acid having two carboxylic acid groups, an anhydride of a $C_4$-$C_8$ unsaturated acid having two carboxylic acid groups, or a mixture thereof, based on the total weight of the ethylene copolymer A; and (ii) the ethylene copolymer B comprises copolymerized units of ethylene and about 6 to about 40 wt % of copolymerized units of at least one polar monomer selected from the group consisting of vinyl acetates, alkyl acrylates, alkyl methacrylates, and mixtures of any two or more thereof, based on the total weight of the ethylene copolymer B, with the proviso that the ethylene copolymer A and the ethylene copolymer B are chemically distinct copolymers. By chemically distinct copolymers is meant the comonomer units are not completely identical in the two copolymers. For example, a copolymer A and a copolymer B are considered chemically distinct when copolymer A is a dipolymer of ethylene and comonomer C and copolymer B is a terpolymer of ethylene, comonomer C, and comonomer D. In a further example, a copolymer A and a copolymer B are considered chemically distinct when copolymer A is a dipolymer of ethylene and comonomer C and copolymer B is a dipolymer of ethylene and comonomer D.

The ethylene copolymer A used in the blend composition may be obtained by copolymerization of ethylene and a comonomer selected from the group consisting of monoesters of $C_4$-$C_8$ unsaturated acids having two carboxylic acid groups, diesters of $C_4$-$C_8$ unsaturated acids having two carboxylic acid groups, anhydrides of $C_4$-$C_8$ unsaturated acids having two carboxylic acid groups, and mixtures of any two or more thereof. The suitable comonomers may include $C_1$-$C_{20}$ alkyl monoesters of butenedioc acids (e.g. maleic acid, fumaric acid, itaconic acid and citraconic acid) such as methyl hydrogen maleate, ethyl hydrogen maleate, propyl hydrogen fumarate, and 2-ethylhexyl hydrogen fumarate, and $C_1$-$C_{20}$ alkyl diesters of butenedioic acids such as dimethylmaleate, diethylmaleate, dibutylcitraconate, dioctylmaleate, and di-2-ethylhexylfumarate. In one embodiment, the ethylene copolymer A is obtained by copolymerization of ethylene and methyl hydrogen maleate or ethyl hydrogen maleate. In a further embodiment, the ethylene copolymer A is obtained by copolymerization of ethylene and ethyl hydrogen maleate.

The ethylene copolymer A may be a dipolymer or a higher order copolymer, such as a terpolymer. For example, when in the form of a terpolymer, the ethylene copolymer A may further comprise less than about 5 wt % of copolymerized units of a third comonomer selected from vinyl acetates, alkyl acrylates, alkyl methacrylates, acrylic acids, methacrylic acids, and derivatives thereof, based on the total weight of the ethylene copolymer A. Suitable derivatives of acrylic acid and methacrylic acid include salts, esters, or other acid derivatives known to one of ordinary skill in the chemical arts. Preferred acid derivatives include methyl acrylate and butyl acrylate, for example.

Specific examples of the ethylene copolymer A used in the blend composition include, but are not limited to, ethylene/maleic acid monoester dipolymers (such as ethylene/ethyl hydrogen maleate dipolymer), ethylene/maleic acid monoester/n-butyl methacrylate terpolymers, ethylene/maleic acid monoester/methyl acrylate terpolymers, ethylene/maleic acid monoester/methyl methacrylate terpolymers, ethylene/maleic acid monoester/ethyl methacrylate terpolymers and ethylene/maleic acid monoester/ethyl acrylate terpolymers.

The ethylene copolymer A used in the blend composition may comprise about 3 to about 20 wt %, or about 6 to about 15 wt %, or about 8 to about 15 wt % of copolymerized units of the ester of the $C_4$-$C_8$ unsaturated acid having two carboxylic acid groups, based on the total weight of the ethylene copolymer A.

The ethylene copolymer A used in the blend composition may be synthesized by random copolymerization of ethylene and the particular comonomer(s) in a high-pressure free radical process, generally an autoclave process. Such processes are described in U.S. Pat. No. 4,351,931. Some exemplary ethylene copolymers that may be used as ethylene copolymer A are described in U.S. Patent Application Publication No. 2005/0187315.

The ethylene copolymer B used in the blend composition may comprise about 6 to about 40 wt %, or about 12 to about 32 wt % of copolymerized units of the at least one polar monomer selected from vinyl acetates, alkyl acrylates, alkyl methacrylates, and mixtures of any two or more thereof, based on the total weight of the ethylene copolymer B.

The ethylene copolymer B may be a dipolymer or a higher order copolymer, such as a terpolymer. When in the form of a higher order copolymer, the ethylene copolymer B may further comprise copolymerized units of one or more additional suitable comonomers excluding monoesters of $C_4$-$C_8$ unsaturated acids having two carboxylic acid groups, diesters of $C_4$-$C_8$ unsaturated acids having two carboxylic acid groups, and anhydrides of $C_4$-$C_8$ unsaturated acids having two carboxylic acid groups. For example, the ethylene copolymer B may be in the form of a terpolymer and further comprise less than about 5 wt % of copolymerized units of a third comonomer selected from acrylic acids, methacrylic acids and derivatives thereof, based on the total weight of the ethylene copolymer B.

In certain embodiments, the ethylene copolymer B is an ethylene/vinyl acetate copolymer comprising copolymerized units of ethylene and vinyl acetate. The ethylene/vinyl acetate copolymer may have a melt flow rate (MFR) of about 0.1 to about 1000 g/10 minutes, or about 0.3 to about 30 g/10 minutes, as determined in accordance with ASTM D1238 at 190° C. and 2.16 kg.

It is understood that the ethylene copolymer B used in the blend composition may be in the form of a single ethylene/vinyl acetate copolymer or a mixture of two or more different ethylene/vinyl acetate copolymers. By different ethylene/vinyl acetate copolymers is meant that the copolymers have different comonomer ratios. They may also be copolymers that have the same comonomer ratios, but different MFR, due to having different molecular weight distributions.

Ethylene/vinyl acetate copolymers useful herein include those available from E. I. du Pont de Nemours and Company (DuPont), Wilmington, Del. under the tradename Elvax®.

In a further embodiment, the ethylene copolymer B is an ethylene/alkyl acrylate copolymer comprising copolymerized units of ethylene and an alkyl acrylate. The alkyl moiety of the alkyl acrylate may contain 1-6 or 1-4 carbon atoms, and may be selected from methyl groups, ethyl groups, and branched or unbranched propyl, butyl, pentyl, and hexyl groups. Exemplary alkyl acrylates include, but are not limited to, methyl acrylate, ethyl acrylate, i-butyl acrylate, and n-butyl acrylate. The polarity of the alkyl acrylate comonomer may be manipulated by changing the relative amount and identity of the alkyl group present in the comonomer. Similarly, a $C_1$-$C_6$ alkyl methacrylate comonomer may be used as a comonomer. Such comonomers include methyl methacrylate, ethyl methacrylate, i-butyl methacrylate, and n-butyl methacrylate.

The ethylene/alkyl acrylate copolymers and ethylene/alkyl methacrylate copolymers useful herein may have melt flow rates ranging from about 0.1 to about 200 g/10 minutes, as determined in accordance with ASTM D1238 at 190° C. and 2.16 kg, and therefore suitable ethylene/alkyl acrylate copolymers and ethylene/alkyl methacrylate copolymers can vary significantly in molecular weight.

It is understood that the ethylene copolymer B used in the blend composition may be in the form of a single ethylene/alkyl acrylate copolymer, a single alkyl methacrylate copolymer, or a mixture of any two or more different ethylene/alkyl acrylate copolymers and/or ethylene alkyl methacrylate copolymers. Blends of at least one ethylene/alkyl acrylate copolymer and at least one ethylene/alkyl methacrylate copolymer are also contemplated as useful in the practice of the invention.

The ethylene/alkyl acrylate copolymers and/or ethylene/alkyl methacrylate copolymers may be prepared by processes well known in the polymer art using either autoclave or tubular reactors. For example, the copolymerization can be conducted as a continuous process in an autoclave, where ethylene, the alkyl acrylate (or alkyl methacrylate), and optionally a solvent such as methanol (see U.S. Pat. No. 5,028,674) are fed continuously into a stirred autoclave such as the type disclosed in U.S. Pat. No. 2,897,183, together with an initiator. In a further embodiment, the ethylene/alkyl acrylate copolymer (or ethylene/alkyl methacrylate copolymer) may be prepared in a tubular reactor, according to the procedure described in the article "High Flexibility EMA Made from High Pressure Tubular Process" (Annual Technical Conference—Society of Plastics Engineers (2002), 60th (Vol. 2), 1832-1836). In a yet further embodiment, the ethylene/alkyl acrylate copolymer (or ethylene/alkyl methacrylate copolymer) may be obtained in a high pressure, tubular reactor at elevated temperature with additional introduction of reactant comonomer along the tube. In a yet further embodiment, the ethylene/alkyl acrylate copolymer or ethylene/alkyl methacrylate copolymer may be produced in a series of autoclave reactors wherein comonomer replacement is achieved by multiple zone introduction of reactant comonomer as taught in U.S. Pat. Nos. 3,350,372; 3,756,996; and 5,532,066.

Ethylene/alkyl acrylate copolymers useful herein include those available from DuPont under the tradename Elvaloy® AC.

The blend composition used herein may further comprise one or more other polyolefins, such as, for example, ethylene homopolymers, propylene homopolymers, additional ethylene copolymers (other than ethylene copolymer A and B), and propylene copolymers. Such optional polyolefin(s) may be present in an amount of up to about 25 wt %, based on the total weight of the blend composition, provided that the inclusion of such optional polyolefin(s) does not adversely affect the desirable performance characteristics of the blend composition, such as the transparency and adhesion properties.

The blend compositions used herein may also contain other additives known within the art. The additives may include, but are not limited to, processing aids, flow enhancing additives, lubricants, pigments, dyes, flame retardants, impact modifiers, nucleating agents, anti-blocking agents such as silica, thermal stabilizers, UV absorbers, UV stabilizers, dispersants, surfactants, chelating agents, coupling agents, reinforcement additives, such as glass fiber, fillers and the like.

Thermal stabilizers can be used and have been widely disclosed within the art. Any known thermal stabilizer may find utility within the compositions useful in the invention. Preferable general classes of thermal stabilizers include, but are not limited to, phenolic antioxidants, alkylated monophenols, alkylthiomethylphenols, hydroquinones, alkylated hydroquinones, tocopherols, hydroxylated thiodiphenyl ethers, alkylidenebisphenols, O-, N- and S-benzyl compounds, hydroxybenzylated malonates, aromatic hydroxybenzyl compounds, triazine compounds, aminic antioxidants, aryl amines, diaryl amines, polyaryl amines, acylaminophenols, oxamides, metal deactivators, phosphites, phosphonites, benzylphosphonates, ascorbic acid (vitamin C), compounds that destroy peroxide, hydroxylamines, nitrones, thiosynergists, benzofuranones, indolinones, and the like and mixtures thereof. The blend composition may contain any effective amount of thermal stabilizers. Use of a thermal stabilizer is optional and in some instances is not preferred. When thermal stabilizers are used, the blend composition contains at least about 0.05 wt %, and up to about 10 wt %, more preferably up to about 5 wt %, and most preferably up to about 1 wt %, of thermal stabilizers, based on the total weight of the blend composition.

UV absorbers can be used and have also been widely disclosed within the art. Any known UV absorber may find utility within the present invention. Preferable general classes of UV absorbers include, but are not limited to, benzotriazoles, hydroxybenzophenones, hydroxyphenyl triazines, esters of substituted and unsubstituted benzoic acids, and the like and mixtures thereof. The blend composition may contain any effective amount of UV absorbers. Use of a UV absorber is optional and in some instances is not preferred. When UV absorbers are utilized, the blend composition contains at least about 0.05 wt %, and up to about 10 wt %, more preferably up to about 5 wt %, and most preferably up to about 1 wt %, of UV absorbers, based on the total weight of the blend composition.

Hindered amine light stabilizers (HALS) can be used and have also been widely disclosed within the art. Generally, hindered amine light stabilizers are disclosed to be secondary, tertiary, acetylated, N-hydrocarbyloxy substituted, hydroxy substituted N-hydrocarbyloxy substituted, or other substituted cyclic amines which are characterized by a substantial amount of steric hindrance, generally derived from aliphatic substitution on the carbon atoms adjacent to the amine function. The blend composition may contain any effective amount of hindered amine light stabilizers. Use of hindered amine light stabilizers is optional and in some instances is not preferred. When hindered amine light stabilizers are used, the blend composition contains at least about 0.05 wt %, and up to about 10 wt %, more preferably up to about 5 wt %, and most preferably, up to about 1 wt %, of hindered amine light stabilizers, based on the total weight of the blend composition.

Silane coupling agents may be added to the blend composition to improve its adhesive strength. Exemplary silane coupling agents that are useful in the compositions of the invention include, but are not limited to, γ-chloropropylmethoxysilane, vinyltrimethoxysilane, vinyltriethoxysilane, vinyltris(β-methoxyethoxy)silane, γ-vinylbenzylpropyltrimethoxysilane, N-β-(N-vinylbenzylaminoethyl)-γ-aminopropyltrimethoxysilane, γ-methacryloxypropyltrimethoxysilane, vinyltriacetoxysilane, γ-glycidoxypropyltrimethoxysilane, γ-glycidoxypropyltriethoxysilane, β-(3,4-epoxycyclohexyl)ethyltrimethoxysilane, vinyltrichlorosilane, γ-mercaptopropylmethoxysilane, γ-aminopropyltriethoxysilane, N-β-(aminoethyl)-γ-aminopropyltrimethoxysilane, and mixtures of two or more thereof. The silane coupling agents are preferably incorporated in the blend composition at a level of about 0.01 to about 5 wt %, or more preferably about 0.05 to about 1 wt %, based on the total weight of the blend composition.

Exemplary blend compositions of ethylene copolymers used herein include, but are not limited to, those disclosed in U.S. Patent Publication Nos. 2006/0160952 and 2006/0148988.

The interlayer sheet used for example, as a safety laminate, may be in a single layer or multilayer form. By "single layer", it is meant that the sheet is made of or consists essentially of the blend composition of ethylene copolymers disclosed herein and described above. When in a multilayer form, it comprises sub-layers and at least one of the sub-layers is made of or consists essentially of the blend composition of ethylene copolymers, while the other sub-layer(s) may be made of or consist essentially of any other suitable polymeric material(s), such as, for example, copolymers of α-olefins and α,β-ethylenically unsaturated carboxylic acids (i.e., acid copolymers), partially neutralized ionic acid copolymers (i.e., ionomers), ethylene/vinyl acetate copolymers, poly(vinyl acetals) (including acoustic grade poly(vinyl acetals)), polyurethanes, polyvinylchlorides, polyethylenes (e.g., linear low density polyethylenes), polyolefin block elastomers, copolymers of α-olefins and α,β-ethylenically unsaturated carboxylic acid esters (e.g., ethylene methyl acrylate copolymers and ethylene butyl acrylate copolymers), silicone elastomers, epoxy resins, and combinations of two or more thereof.

The interlayer sheet comprising the blend composition of ethylene copolymers may have a smooth or rough surface on one or both sides. Preferably, the sheet has rough surfaces on both sides to facilitate deaeration during the lamination process. Rough surfaces can be created by mechanically embossing or by melt fracture during extrusion of the sheets followed by quenching so that surface roughness is retained during handling. The surface pattern can be applied to the sheet through well-known, common art processes. For example, the extruded sheet may be passed over a specially prepared surface of a die roll positioned in close proximity to the exit of the extruder die. This imparts the desired surface characteristics to one side of the molten polymer exiting the die. Thus, when the surface of such a die roll has minute peaks and valleys, it will impart a rough surface to the side of the polymer sheet that passes over the roll, and the rough surface will generally conform respectively to the valleys and peaks of the roll surface. Such die rolls are disclosed in, e.g., U.S. Pat. No. 4,035,549 and U.S. Patent Publication No. 2003/0124296.

The interlayer sheets comprising the blend composition of ethylene copolymers may be produced by any suitable process. For example, the sheets may be formed through dipcoating, solution casting, compression molding, injection molding, lamination, melt extrusion casting, blown film, extrusion coating, tandem extrusion coating, or by any other procedures that are known to those of skill in the art. The sheets may also be formed by melt extrusion casting, melt coextrusion casting, melt extrusion coating, blown film process, or tandem melt extrusion coating processes.

In one embodiment, a safely laminate comprises at least one interlayer sheet comprising the blend composition of ethylene copolymers that is laminated to at least one rigid sheet or film layer. By "laminated", it is meant that, within a laminated structure, the two layers are bonded either directly (i.e., without any additional material between the two layers) or indirectly (i.e., with additional material, such as interlayer or adhesive materials, between the two layers).

The rigid sheets suitable for use herein comprise a material with a modulus of about 100,000 psi (690 MPa) or greater (as measured by ASTM Method D-638). The rigid sheets used herein may be formed of glass, metal, ceramic, or of polymers including polycarbonates, acrylics, polyacrylates, cyclic polyolefins, polystyrene prepared in the presence of metallocene catalysts, and combinations of two or more thereof.

The term "glass" includes not only window glass, plate glass, silicate glass, sheet glass, low iron glass, tempered glass, tempered CeO-free glass, and float glass, but also colored glass, specialty glass (such as those containing ingredients to control solar heating), coated glass (such as those sputtered with metals (e.g., silver or indium tin oxide) for solar control purposes), low E-glass, Toroglas® glass (Saint-Gobain N.A. Inc., Trumbauersville, Pa.), Solexia™ glass (PPG Industries, Pittsburgh, Pa.) and Starphire® glass (PPG Industries). Such specialty glasses are disclosed in, e.g., U.S. Pat. Nos. 4,615,989; 5,173,212; 5,264,286; 6,150,028; 6,340, 646; 6,461,736; and 6,468,934. It is understood, however, that the type of glass to be selected for a particular module depends on the intended use.

The film layers used herein may be metal (such as aluminum foil) or polymeric. Polymeric film materials include, but are not limited to, polyesters (e.g., poly(ethylene terephthalate) and poly(ethylene naphthalate)), polycarbonates, polyolefins (e.g., polypropylene, polyethylene, and cyclic polylolefins), norbornene polymers, polystyrenes (e.g., syndiotactic polystyrene), styrene-acrylate copolymers, acrylonitrile-styrene copolymers, polysulfones (e.g., polyethersulfone, and polysulfone), polyamides, polyurethanes, acrylic polymers, cellulose acetates (e.g., cellulose acetate and cellulose triacetates), cellophanes, vinyl chloride polymers (e.g., poly(vinyl chloride) and poly(vinylidene chloride)), fluoropolymers (e.g., poly(vinyl fluoride), poly(vinylidene fluoride), polytetrafluoroethylene, and ethylene-tetrafluoroethylene copolymers), and combinations of two or more thereof. When the polymeric film is located at the outside surface of the safety laminate, it may be further coated with an abrasion resistant hardcoat. Any material known for use in abrasion resistant hardcoats may be used. For example, the hardcoat may comprise polysiloxanes or crosslinked (thermosetting) polyurethanes. Also suitable are oligomeric-based coatings, such as those described in U.S. Patent Application Publication No. 2005/0077002, which are prepared by the reaction of (A) hydroxyl-containing oligomer with isocyanate-containing oligomer or (B) anhydride-containing oligomer with epoxide-containing compound. In certain embodiments, the hardcoat may comprise a polysiloxane abrasion resistant coating, such as those described in U.S. Pat. Nos. 4,177,315; 4,469,743; 5,415,942; and 5,763,089.

The laminates, especially when used as safety laminates, may further comprise other polymeric interlayer sheets formed of polymeric materials, such as, poly(vinyl acetal) (e.g., poly(vinyl butyral)), poly(vinyl chloride), polyurethane, ethylene/vinyl acetate copolymers, ethylene acid copolymers, ionomers, or combinations of two or more thereof. In addition, when two or more polymeric sheets are incorporated in the laminate, the polymeric interlayer sheets may be formed of common or different polymeric materials.

Each of the interlayer sheets comprising the blend composition of ethylene copolymers and the other polymeric interlayer sheets comprised in the laminates may have a thickness of at least about 5 mils (0.1 mm), or at least about 30 mils (0.8 mm), or about 30 to about 200 mils (about 0.8 to about 5.1 mm), or about 45 to about 200 mils (about 1.1 to about 5.1 mm), or about 45 to about 100 mils (about 1.1 to about 2.5 mm), or about 45 to about 90 mils (about 1.1 to about 2.3 mm).

In one embodiment, the laminate may comprise (a) a first rigid sheet or film layer, which is laminated to, (b) a sheet comprising the blend composition of ethylene copolymers, which is laminated to, (c) a second rigid sheet or film layer. In a further embodiment, the laminate may comprise two glass sheets with an interlayer sheet comprising the blend composition of ethylene copolymers laminated between the two glass sheets, or the laminate may comprise a glass sheet and a hardcoated polyester film with an interlayer sheet comprising the blend composition of ethylene copolymers laminated between the glass sheet and the hardcoated plastic film. In a yet further embodiment, the laminate may comprise n rigid sheets or film layers and n−1 polymeric interlayer sheets, wherein (a) n is an integer of 1-10; (b) each pair of the adjacent rigid sheets or film layers are interspaced by one of the polymeric interlayer sheets; and (c) at least one of the n−1 polymeric interlayer sheets comprises the blend composition disclosed above.

Any lamination process known within the art (such as an autoclave or a non-autoclave process) may be used to prepare the laminates. For example, the laminate may be made by an autoclave process, such as disclosed in U.S. Pat. No. 3,311, 517, or a non-autoclave lamination process, such as disclosed in U.S. Pat. Nos. 3,234,062; 3,852,136; 4,341,576; 4,385, 951; 4,398,979; 5,536,347; 5,853,516; 6,342,116; and 5,415, 909, U.S. Patent Publication No. 2004/0182493, European Patent No. EP 1 235 683 B1, PCT Patent Publication Nos. WO91/01880 and WO03057478.

If desired, one or both surfaces of any of the component layers comprised in the laminate may be treated prior to the lamination process to enhance the adhesion to other laminate layers. This adhesion enhancing treatment may take any form known within the art and includes flame treatments (see, e.g., U.S. Pat. Nos. 2,632,921; 2,648,097; 2,683,894; and 2,704, 382), plasma treatments (see e.g., U.S. Pat. No. 4,732,814), electron beam treatments, oxidation treatments, corona discharge treatments, chemical treatments, chromic acid treatments, hot air treatments, ozone treatments, ultraviolet light treatments, and blast treatments, solvent treatments, and combinations of two or more thereof. Also, the adhesion strength may be further improved by further applying an adhesive or primer coating on the surface of the laminate layer(s). For example, U.S. Pat. No. 4,865,711 discloses a film or sheet with improved bondability, which has a thin layer of carbon deposited on one or both surfaces. Other exemplary adhesives or primers may include silanes, poly(allyl amine) based primers (see e.g., U.S. Pat. Nos. 5,411,845; 5,770,312; 5,690,994; and 5,698,329), and acrylic based primers (see e.g., U.S. Pat. No. 5,415,942). The adhesive or primer coating may take the form of a monolayer of the adhesive or primer and have a thickness of about 0.0004 to about 1 mil (about 0.00001 to about 0.03 mm), or preferably, about 0.004 to about 0.5 mil (about 0.0001 to about 0.013 mm), or more preferably, about 0.004 to about 0.1 mil (about 0.0001 to about 0.003 mm).

The invention is further illustrated by the following examples of certain embodiments.

EXAMPLES

The following polymer materials were used in the examples:

- EMA-1—an ethylene/methyl acrylate copolymer comprising 20 wt % of copolymerized units of methyl acrylate, based on the total weight of the copolymer, and having a melt flow rate of 8 g/10 min, as determined in accordance with ASTM D1238 at 190° C. and 2.16 kg;
- EMA-2—an ethylene/n-butyl acrylate copolymer comprising 27 wt % of copolymerized units of n-butyl acrylate, based on the total weight of the copolymer, and having a melt flow rate of 4 g/10 min, as determined in accordance with ASTM D1238 at 190° C. and 2.16 kg;
- EMA-3—an ethylene/methyl acrylate copolymer comprising 24 wt % of copolymerized units of methyl acrylate, based on the total weight of the copolymer, and having a melt flow rate of 2 g/10 min, as determined in accordance with ASTM D1238 at 190° C. and 2.16 kg.
- E/MAME-1—an ethylene/monoethyl maleate copolymer comprising 9.5 wt % of copolymerized units of the monoethyl ester of maleic acid, based on the total weight of the copolymer, and having a melt flow rate of 30 g/10 min, as determined in accordance with ASTM D1238 at 190° C. and 2.16 kg;
- E/MAME-2—an ethylene/monoethyl maleate copolymer comprising 15 wt % of copolymerized units of the monoethyl ester of maleic acid, based on the total weight of the copolymer, and having a melt flow rate of 30 g/10 min, as determined in accordance with ASTM D1238 at 190° C. and 2.16 kg;
- EVA-1—an ethylene/vinyl acetate copolymer comprising 28 wt % of copolymerized units of vinyl acetate, based on the total weight of the copolymer, and having a melt flow rate of 2 g/10 min, as determined in accordance with ASTM D1238 at 190° C. and 2.16 kg;
- EVA-2—an ethylene/vinyl acetate copolymer comprising 25 wt % of copolymerized units of vinyl acetate, based on the total weight of the copolymer, and having a melt flow rate of 2 g/10 min, as determined in accordance with ASTM D1238 at 190° C. and 2.16 kg;
- ECP-1—a blend of EMA-1 (80 wt %) and E/MAME-1 (20 wt %), which has a melt flow rate of 10 g/10 min, as determined in accordance with ASTM D1238 at 190° C. and 2.16 kg, and was prepared by melt blending using a 30 mm diameter twin screw extruder with a mixing screw at a melt temperature of 180° C. to 230° C.;
- ECP-2—a blend of EMA-2 (80 wt %) and E/MAME-2 (20 wt %), which has a melt flow rate of 4.5 g/10 min, as determined in accordance with ASTM D1238 at 190° C. and 2.16 kg, and was prepared by melt blending using a 30 mm diameter twin screw extruder with a mixing screw at a melt temperature of 180° C. to 230° C.;
- ECP-3—a blend of EVA-1 (80 wt %) and E/MAME-2 (20 wt %), which has a melt flow rate of 3.2 g/10 min, as determined in accordance with ASTM D1238 at 190° C. and 2.16 kg, and was prepared by melt blending using a 30 mm diameter twin screw extruder with a mixing screw and at a melt temperature of 180° C. to 230° C.;
- ECP-4—a blend of EMA-1 (80 wt %) and E/MAME-2 (20 wt %), which has a melt flow rate of 7.7 g/10 min, as determined in accordance with ASTM D1238 at 190° C. and 2.16 kg, and was prepared by melt blending using a 30 mm diameter twin screw extruder with a mixing screw at a melt temperature of 180° C. to 230° C.;
- ECP-5—a blend of EMA-3 (80 wt %) and E/MAME-2 (20 wt %), which has a melt flow rate of 2.9 g/10 min, as determined in accordance with ASTM D1238 at 190° C. and 2.16 kg, and was prepared by melt blending using a 30 mm diameter twin screw extruder with a mixing screw at a melt temperature of 180° C. to 230° C.;
- ECP-6—a blend of EMA-2 (80 wt %) and E/MAME-1 (20 wt %), which has a melt flow rate of 4.8 g/10 min, as determined in accordance with ASTM D1238 at 190° C. and 2.16 kg, and was prepared by melt blending using a 30 mm diameter twin screw extruder with a mixing screw at a melt temperature of 180° C. to 230° C.;
- EAA-1—an ethylene/acrylic acid copolymer comprising 18 wt % of copolymerized units of acrylic acid, based on the total weight of the copolymer, and having a melt flow rate of about 60 g/10 min, as determined in accordance with ASTM D1238 at 190° C. and 2.16 kg;
- EMAA-1—an ethylene/methacrylic acid copolymer comprising 12 wt % of copolymerized units of methacrylic acid, based on the total weight of the copolymer, and having a melt flow rate of 13.5 g/10 min, as determined in accordance with ASTM D1238 at 190° C. and 2.16 kg;
- EMA/EAA blend—a blend of EMA-1 (80 wt %) and EAA-1 (20 wt %), prepared by melt blending using a 30 mm diameter twin screw extruder with a mixing screw at a melt temperature of 180° C. to 230° C.;

Each of the polymer materials listed above was formed into a press molded film or a cast film. In particular, the press molded films were prepared using press molds set at a temperature of 180° C.-210° C., while the cast films were prepared by feeding the polymer resin into a twin screw extruder (with a diameter of 28 mm and a length to diameter ratio of (L/D) of 28:1) that was operated with ramped extruder zone temperature of 160° C. to 180° C., passing the polymer melt through a 10 in (25.4 cm) wide slot die that was operated at a temperature of 180° C., and casting the polymer melt onto a casting roll that was chilled to 20° C.

Examples E1-E9 and Comparative Examples CE1-CE8

In Examples E1-E9 and Comparative Examples CE1-CE8, each film was laminated between a sheet of glass and a Tedlar@/polyethylene terephthalate (PET)/Tedlar® tri-layer film ("TPT"), thereby forming a glass laminate with the structure of glass/interlayer/TPT. The glass sheets used were ⅛ in (3.2 mm) thick Krystal Klear® glass (AGC Flat Glass North America, Inc. Alpharetta, Ga.) having a size of 4×4 inch (10×10 cm). The TPT tri-layer films used were formed of a polyester film sandwiched between two Tedlar® films from DuPont. Each of the glass laminates was prepared in accordance with the lamination process outlined below.

Specifically, in forming each of the laminates listed in Table 1 (CE1-CE8 and E1-E3), the compression molded interlayer film (1×4 in (2.5×10 cm)) was positioned between a TPT film (1×9 in (2.5×23 cm)) and a glass sheet with the "Tin Side" of the glass sheet facing the interlayer film. Such a pre-lamination assembly was then placed into a Meier ICO-LAM 10/08 laminator (Meier Vakuumtechnik GmbH, Bocholt, Germany) and laminated. The lamination cycle included an evacuation step (vacuum of 3 in. Hg (76 mm Hg))

of 3-5 minutes and a pressing step at a pressure of one atmosphere (101,325 Pa) for 0.5-5 minutes at ta laminator temperature setting of at 140° C.

In forming each of the laminates listed in Table 2 (E4-E9), a 5 mil (0.13 mm) thick Teflon® fluorinated ethylene propylene (FEP) film (DuPont) (½×4 in (1.3×10 cm)) was placed on the top of a glass sheet (4×4 in (10×10 cm)) in a position such that the long edge of the FEP film strip was aligned with one edge of the glass sheet to serve as the open space for conducting further peel adhesion testing. The cast interlayer film (4×9 in (10×23 cm)) was then placed onto the glass sheet covering the glass and the FEP film and extending 5 in (13 cm) past the edge along which the FEP film and the glass sheet were aligned. Finally, a TPT film (4×9 in (10×23 cm)) was placed over the interlayer film with the polished (or reflective) side down and facing the interlayer film. Such pre-lamination assembly was then laminated as disclosed above. Finally, the FEP film strip was removed, along its 9 in (23 cm) length, the interlayer/TPT film was cut into three 1-inch (2.5-mm) wide strips, and then using a sharp edged, flat bladed razor knife the bond between the interlayer film and the glass was separated to a depth of about ¼ in (33 mm) from the edge where the FEP film had been placed.

Using an Instron tester (Instron Tensile Tester Model 1122) the interlayer/TPT film layers were peeled away from the glass sheet at a 180° angle and a 12.7 cm/min rate, before and/or after a 24-hour or 91-hour immersion of the laminate in water at ambient temperature. The peel load for each sample was reported in Tables 1 and 2.

As shown in Table 1, interlayers made of EMA-1 (CE1) exhibited virtually no adhesion to glass, while interlayers made of EVA-1 or EVA-2 (CE4 or CE5) exhibited little adhesion to glass. Interlayers made of E/MAME-1 or E/MAME-2 (CE2 or CE3) provided good adhesion to glass when the lamination conditions included a 5-minute evacuation and a 3-minute press. After the 24-hour water treatment, all the interlayers (except one made of E/MAME-1) lost adhesion to glass.

In comparison, as shown by E1-E9, all interlayers made of blends of E/MAME AND EMA OR EVA, except two samples, provided good adhesion to glass before and after water treatment. The two sample laminates, where the interlayers failed to provide good adhesion after the 24-hour water treatment, were prepared under lamination conditions that included a 3-minute evacuation and a 0.5-minute press.

Further, interlayers made of EAA-1 or EMAA-1 (CE6 or CE7) provided good adhesion to glass prior to the water treatment, but not following the water treatment. The results further show that the adhesion to glass for those interlayers made of EMA/EAA Blend (CE8, EMA-1 and EAA-1 blend) was higher than that for those interlayers made of EMA-1 (CE1) but lower than that for those interlayers made of EAA-1 (CE6). This is expected for a blend sample which generally exhibits the average properties of both components.

TABLE 1

| Examples | Interlayer Material | Evacuation Time (min) | Pressing Time (min) | Water Treatment[e] | 180° Peel Load (lbs/in) |
|---|---|---|---|---|---|
| CE1 | EMA-1 | 3 | 2 | NO | 0 |
|  |  | 5 | 1.5 | NO | 0.01 |
|  |  | 5 | 3 | NO | 0.14[a] |
|  |  | 3 | 2 | YES | 0 |
|  |  | 5 | 1.5 | YES | 0 |
|  |  | 5 | 3 | YES | 0 |
| CE2 | E/MAME-1 | 3 | 2 | NO | 2.42[b] |
|  |  | 5 | 1.5 | NO | 2.3[a] |
|  |  | 5 | 3 | NO | 16.91 |
|  |  | 3 | 2 | YES | 0.23 |
|  |  | 5 | 1.5 | YES | 10.73 |
|  |  | 5 | 3 | YES | 1.7 |
| CE3 | E/MAME-2 | 3 | 2 | NO | 1.58[a] |
|  |  | 5 | 1.5 | NO | 0.71[a] |
|  |  | 5 | 3 | NO | 15.44 |
|  |  | 3 | 2 | YES | 0 |
|  |  | 5 | 1.5 | YES | 0 |
|  |  | 5 | 3 | YES | 0 |
| CE4 | EVA-1 | 3 | 5 | NO | 0.13 |
|  |  | 3 | 5 | YES | 0 |
| CE5 | EVA-2 | 3 | 5 | NO | 0.11 |
|  |  | 3 | 5 | YES | 0 |
| E1 | ECP-1 | 3 | 0.5 | NO | 14.66[a] |
|  |  | 3 | 2 | NO | 24.33[a] |
|  |  | 3 | 2 | NO | 21.89[c] |
|  |  | 3 | 5 | NO | 14.07 |
|  |  | 5 | 0.5 | NO | 11.93 |
|  |  | 5 | 1.5 | NO | 22.83 |
|  |  | 5 | 2 | NO | 27.94 |
|  |  | 5 | 3 | NO | 22.42 |
|  |  | 3 | 0.5 | YES | 1.8 |
|  |  | 3 | 2 | YES | 14.53 (2) |
|  |  | 3 | 2 | YES | 13.25[c] |
|  |  | 3 | 5 | YES | 19.5 |
|  |  | 5 | 0.5 | YES | 12.67 |
|  |  | 5 | 1.5 | YES | 10.63 |
|  |  | 5 | 2 | YES | 13.83 |
|  |  | 5 | 3 | YES | 23.23[a] |
|  |  | 5 | 3 | YES | 39.49[c] |
| E2 | ECP-2 | 3 | 0.5 | NO | 11.2[a] |
|  |  | 3 | 5 | NO | 40.48 |
|  |  | 3 | 2 | NO | 27.33[a,c] |
|  |  | 5 | 0.5 | NO | 12.74 |
|  |  | 5 | 2 | NO | 15.02 |
|  |  | 5 | 3 | NO | 33.29 |
|  |  | 3 | 0.5 | YES | 7.92[a] |
|  |  | 3 | 2 | YES | 17.65 |
|  |  | 3 | 2 | YES | 18.14[c] |
|  |  | 3 | 5 | YES | 47.28 |
|  |  | 5 | 0.5 | YES | 14.16 |
|  |  | 5 | 2 | YES | 17.86 |
|  |  | 5 | 3 | YES | N/A[d] |
| E3 | ECP-3 | 3 | 5 | NO | 29.96[a] |
|  |  | 3 | 5 | YES | 31.67 |
|  |  | 5 | 3 | YES | 22.17 |
| CE6 | EAA-1 | 3 | 5 | NO | 21.2 |
|  |  | 5 | 3 | NO | 13 |
|  |  | 3 | 5 | YES | 1.5 |
|  |  | 5 | 3 | YES | 5.6 |
| CE7 | EMAA-1 | 3 | 5 | NO | 32.4 |
|  |  | 5 | 3 | NO | 36.9 |
|  |  | 3 | 5 | YES | 6 |
|  |  | 5 | 3 | YES | 0.6 |
| CE8 | EMA/EAA Blend | 3 | 5 | NO | 7.7 |
|  |  | 5 | 3 | No | 3 |
|  |  | 3 | 5 | YES | 3.7 |
|  |  | 5 | 3 | YES | 4.3[a] |

Note:
[a]Average of two tests;
[b]Average of three tests;
[c]The laminator temperature was set at 150° C. when the laminate was made;
[d]The glass sheet in the laminate was broken.
[e]a 24-hour immersion in water at ambient temperature.

TABLE 2

| Examples | Interlayer Material | Evacuation Time (min) | Pressing Time (min) | Water Treatment[b] | 180° Peel Load (lb/in) |
|---|---|---|---|---|---|
| E4 | ECP-1 | 3 | 5 | NO | 44.1 |
|  |  | 3 | 5 | YES | 9.7 |
| E5 | ECP-2 | 3 | 5 | NO | 38.2 |
|  |  | 3 | 5 | YES | 31.5[a] |
| E6 | ECP-3 | 3 | 5 | NO | 34.6 |
|  |  | 3 | 5 | YES | 11.2 |
| E7 | ECP-4 | 3 | 5 | NO | 42.9 |
|  |  | 3 | 5 | YES | 22.6 |
| E8 | ECP-5 | 3 | 5 | NO | 36.3 |
|  |  | 3 | 5 | YES | 14.5 |
| E9 | ECP-6 | 3 | 5 | NO | 41.4 |
|  |  | 3 | 5 | YES | 28.3 |

Note:
[a] Aaverage of two tests;
[b] 91-hour immersion in water at ambient temperature.

Examples E10-15 and Comparative Examples CE9-CE11

In these examples, solar energy transmittance for cast films made from blends of E/MAME and EMA or EVA (E10-E15), EMA-1 (CE9), EMA-2 (CE10), or E/MAME (CE11) was determined in accordance with ASTM E424. As shown in Table 3, the cast films made from blends of E/MAME and EMA or EVA retain good transmittance compared to those made from E/MAME or EMA alone.

TABLE 3

| Examples | Adhesive Sample | Cast film Thickness (mil) | Solar Energy Transmittance (%) |
|---|---|---|---|
| E10 | ECP-1 | 18.4 | 90.1 |
| E11 | ECP-2 | 15.4 | 91.2 |
| E12 | ECP-3 | 16.6 | 91.6 |
| E13 | ECP-4 | 15.7 | 90.9 |
| E14 | ECP-5 | 15.6 | 91.2 |
| E15 | ECP-6 | 23.6 | 89.7 |
| CE9 | EMA-1 | 19 | 90.9 |
| CE10 | EMA-2 | 20 | 90.7 |
| CE11 | E/MAME-1 | 10 | 86.8 |

Examples E16 and E17

In E16, a two-layer laminate comprising a 10 mil (0.25 mm) thick press molded film of ECP-1 and a 5 mil (0.051 mm) thick DuPont Kapton® film were made by pressing the two films for 30 seconds at 140° C. under 100 psi (0.689 MPa) in a pre-heated press. Using an Instron tester (Instron Tensile Tester Model 1122) the ECP-1 film was peeled away from the Kapton® film at a 180° angle and a 12.7 cm/min rate, and the peel load was recorded as 4.5 lb/in.

In E17, a two-layer laminate with the same structure of that in E16 was prepared similarly, except that the films were pressed together at 160° C., and the peel load was recorded as 5.2 lb/in.

What is claimed is:

1. A laminate comprising an interlayer sheet that is laminated to one or more film layers or rigid sheets, wherein the rigid sheet comprises a material having a modulus of about 690 MPa or greater (as measured by ASTM Method D638), the at least one interlayer sheet comprising a blend composition of ethylene copolymers that has a melt flow rate of less than 100 g/10 min, as determined in accordance with ASTM D1238 at 190° C. and 2.16 kg, and comprises:

A. about 5 to about 95 wt % of an ethylene copolymer A, based on the total weight of the blend composition, wherein the ethylene copolymer A comprises copolymerized units of ethylene and about 3 to about 20 wt % of a comonomer selected from the group consisting of esters of $C_4$-$C_8$ unsaturated acids having two carboxylic acid groups, anhydrides of $C_4$-$C_8$ unsaturated acids having two carboxylic acid groups, and mixtures thereof, based on the total weight of the ethylene copolymer A; and B. about 5 to about 95 wt % of an ethylene copolymer B, based on the total weight of the blend composition, wherein ethylene copolymer B comprises copolymerized units of ethylene and about 6 to about 40 wt % of at least one polar monomer selected from the group consisting of vinyl acetate, alkyl acrylates, alkyl methacrylates, and mixtures of any two or more thereof, based on the total weight of the ethylene copolymer B, with the proviso that ethylene copolymer A and ethylene copolymer B are chemically distinct.

2. The laminate of claim 1, wherein the blend composition comprises about 5 to about 40 wt % of the ethylene copolymer A and about 60 to about 95 wt % of the ethylene copolymer B, based on the total weight of the blend composition.

3. The laminate of claim 1, wherein ethylene copolymer A comprises an ester of a $C_4$-$C_8$ unsaturated acid having two carboxylic acid groups that is selected from the group consisting of monoesters of $C_4$-$C_8$ unsaturated acids having two carboxylic acid groups, diesters of $C_4$-$C_8$ unsaturated acids having two carboxylic acid groups, and mixtures of any two or more thereof.

4. The laminate of claim 1, wherein the ethylene copolymer A comprises about 6 to about 15 wt % of copolymerized units of a monoester of a $C_4$-$C_8$ unsaturated acid having two carboxylic acid groups.

5. The laminate of claim 4, wherein the ethylene copolymer A comprises about 8 to about 15 wt % of copolymerized units of ethyl hydrogen maleate.

6. The laminate of claim 1, wherein the ethylene copolymer B comprises about 12 to about 32 wt % of copolymerized units of the at least one polar monomer.

7. The laminate of claim 1, wherein the at least one polar monomer is vinyl acetate.

8. The laminate of claim 1, wherein the at least one polar monomer is selected from the group consisting of $C_1$-$C_6$ alkyl acrylates, $C_1$-$C_6$ alkyl methacrylates, and mixtures of two or more thereof.

9. The laminate of claim 1, wherein the at least one polar monomer is selected from the group consisting of methyl acrylate, ethyl acrylate, i-butyl acrylate, and n-butyl acrylate.

10. A laminate of claim 1, wherein the rigid sheet layer comprises a material selected from the group consisting of glass, metal, ceramics, and polymers, and wherein a film layer is a metal film or a polymeric film comprising a material selected from the group consisting of polyesters, polycarbonates, polyolefins, norbornene polymers, polystyrenes, styrene-acrylate copolymers, acrylonitrile-styrene copolymers, polysulfones, polyamides, polyurethanes, acrylic polymers, cellulose acetates, cellophanes, vinyl chloride polymers, fluoropolymers, and mixtures of two or more thereof.

11. A laminate of claim 1, wherein the interlayer is a multilayer interlayer having sublayers wherein one or more of the sublayers comprises a material selected from the group consisting of poly(vinyl acetals), poly(vinyl chlorides), polyurethanes, ethylene/vinyl acetate copolymers, copolymers of α-olefins and α,β-ethylenically unsaturated carboxylic acids, ionomers of copolymers of α-olefins and α,β-ethylenically unsaturated carboxylic acids, and mixtures of two or more thereof.

12. A laminate of claim 11, which comprises n rigid sheets or film layers and n−1 polymeric interlayer sheets, wherein (a) n is an integer of 1-10; (b) each pair of adjacent rigid sheets or film layers are interspaced with one polymeric interlayer sheet; and (c) at least one polymeric interlayer sheet is a sheet comprising the blend composition as recited in claim 1.

13. A laminate of claim 1, wherein the interlayer sheet comprising the blend composition is laminated between two glass sheets.

14. A laminate of claim 1, wherein the interlayer sheet comprising the blend composition is laminated between a glass sheet and a polyester film that is coated on one surface with an abrasion resistant hardcoat, the coated surface of the polyester film facing away from the interlayer sheet.

15. A laminate of claim 1 wherein the interlayer is a multilayer interlayer having a plurality of sublayers each comprising the blend of claim 1 and at least one additional sublayer comprising a material selected from the group consisting of poly(vinyl acetals), poly(vinyl chlorides), polyurethanes, ethylene/vinyl acetate copolymers, copolymers of α-olefins and α,β-ethylenically unsaturated carboxylic acids, ionomers of copolymers of α-olefins and α,β-ethylenically unsaturated carboxylic acids, and mixtures of two or more thereof.

* * * * *